(12) United States Patent
Kwon et al.

(10) Patent No.: US 8,302,103 B2
(45) Date of Patent: Oct. 30, 2012

(54) SYSTEM AND METHOD FOR MANAGING RESOURCES OF APPLICATIONS AND THREADS PERFORMED ON JAVA VIRTUAL MACHINE

(75) Inventors: Ho-bum Kwon, Suwon-si (KR); Ho-seok An, Yongin-si (KR); Bok-yeon Lee, Suwon-si (KR); Seung-bum Chung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1254 days.

(21) Appl. No.: 12/054,865

(22) Filed: Mar. 25, 2008

(65) Prior Publication Data

US 2008/0244576 A1 Oct. 2, 2008

(30) Foreign Application Priority Data

Mar. 28, 2007 (KR) ........................ 10-2007-0030376

(51) Int. Cl.
*G06F 9/46* (2006.01)
*G06F 9/455* (2006.01)

(52) U.S. Cl. ........................................ 718/104; 718/1

(58) Field of Classification Search ............ 718/1, 104; 711/170, 154; 709/316
See application file for complete search history.

(56) References Cited

U.S. PATENT DOCUMENTS

| | | | |
|---|---|---|---|
| 6,782,408 B1 * | 8/2004 | Chandra et al. | 718/104 |
| 6,910,209 B2 | 6/2005 | Kawahara et al. | |
| 6,931,544 B1 | 8/2005 | Kienhofer et al. | |
| 7,073,177 B2 | 7/2006 | Foote et al. | |
| 7,293,090 B1 * | 11/2007 | Saleh et al. | 709/226 |
| 7,389,303 B2 * | 6/2008 | Verma et al. | 1/1 |
| 2001/0042139 A1 * | 11/2001 | Jeffords et al. | 709/316 |
| 2003/0083892 A1 * | 5/2003 | Ramachandran et al. | 705/1 |
| 2003/0115245 A1 | 6/2003 | Fujisawa | |
| 2003/0140179 A1 * | 7/2003 | Wilt et al. | 709/321 |
| 2003/0172213 A1 * | 9/2003 | Garcia et al. | 710/113 |
| 2004/0221290 A1 | 11/2004 | Casey et al. | |

(Continued)

FOREIGN PATENT DOCUMENTS

JP 8-249226 A 9/1996

(Continued)

OTHER PUBLICATIONS

Communication dated Dec. 30, 2011 from the Korean Intellectual Property Office in counterpart Korean application No. 10-2007-0030376.

(Continued)

*Primary Examiner* — Thomas Lee
*Assistant Examiner* — Phil Nguyen
(74) *Attorney, Agent, or Firm* — Sughrue Mion, PLLC

(57) ABSTRACT

A method of managing resources related to a Java Virtual Machine (JVM) and an application executed in the JVM is provided. The method includes defining a resource identifier uniquely identifying an arbitrary resource to be; generating a resource consumer for each thread, wherein the resource consumer uses a resource; generating at least one resource manager per resource identifier, wherein the resource manager manages a resource, and storing the at least one resource manager in a resource manager registry; calculating a quantity of resource usage by resource managers generated for all applications and threads in the applications, and storing the calculated quantity of resource usage, wherein the calculating and storing of the quantity are performed by each of the resource managers; and informing about the quantity of resource usage.

13 Claims, 13 Drawing Sheets

U.S. PATENT DOCUMENTS

| | | | |
|---|---|---|---|
| 2005/0021487 A1* | 1/2005 | Verma et al. | 707/1 |
| 2005/0259581 A1* | 11/2005 | Murray et al. | 370/232 |
| 2006/0095919 A1 | 5/2006 | Shiomi et al. | |
| 2007/0028068 A1* | 2/2007 | Golding et al. | 711/170 |
| 2007/0157209 A1* | 7/2007 | Hashimoto et al. | 718/104 |

FOREIGN PATENT DOCUMENTS

| | | |
|---|---|---|
| JP | 2002-259146 A | 9/2002 |
| JP | 2003-186683 A | 7/2003 |
| KR | 10-2002-0053516 A | 7/2002 |
| KR | 10-2007-0009777 A | 1/2007 |

OTHER PUBLICATIONS

Czajkowski et al. "Multitasking without Compromise: a Virtual Machine Evolution." pp. 1-14.

Back et al. "Process in KaffeOS: Isolation, Resource Management, and Sharing in Java." pp. 1-14.

Czajkowski et al. "A Resource Management Interface for the Java Platform." SMLI TR-2003-124, May 2003, pp. 1-20.

* cited by examiner

SYSTEM AND METHOD FOR MANAGING RESOURCES OF APPLICATIONS AND THREADS PERFORMED ON JAVA VIRTUAL MACHINE

CROSS-REFERENCE TO RELATED PATENT APPLICATION

This application claims priority from Korean Patent Application No. 10-2007-0030376, filed on Mar. 28, 2007 in the Korean Intellectual Property Office, the disclosure of which is incorporated herein in its entirety by reference.

BACKGROUND OF THE INVENTION

1. Field of the Invention

Methods and systems consistent with the present invention relate to managing resources used by applications and threads in the applications, and more particularly, to managing resources used by applications and threads in the applications in a containment framework environment in which an application manager resides, thereby executing/ending several Java applications, wherein the containment framework is within electronic equipment.

2. Description of the Related Art

A Java Virtual Machine (JVM) enables downloading of an application and executing the application in a network environment, so that the JVM is used as a standard application performance environment in various information equipment.

FIG. 1 is a block diagram illustrating a representative configuration of a related art JVM.

A JVM 101 basically includes a class loader 102 which embeds a class (a binary executable file format of Java), a Just-In-Time (JIT) compiler 104 which pre-converts commands of a virtual machine (e.g. JVM) into machine codes of a Central Processing Unit (CPU) while performing a class, thereby improving speed, an interpreter 105 which recognizes commands of a virtual machine as components for executing performance codes of a class and then carrying out the commands, and a Garbage Collector (GC) 106 which manages resources during runtime.

FIG. 2 is a block diagram illustrating an example of a containment framework in which an application manager resides, thereby generating and ending several applications. The containment framework includes an Operation System (OS) 205, a JVM 204, middleware 203, e.g., OpenCable Application Platform (OCAP) or Advanced Common Application Platform (ACAP), which enables an application to be operated, an application manager 202 which manages a lifecycle of an application, Java applications 1 through n 206, and a native application 207.

FIG. 3 is a diagram illustrating an example of electronic equipment including a containment framework 306 illustrated in FIG. 2, wherein the example is digital data broadcasting information equipment. The information equipment includes a CPU 303, a display processor 302, a main memory 305 required so as to execute a program, and additional hardware 304 including an external connection port, such as a Universal Serial Bus (USB) port, a Serial port, an infrared (IR) port or the like, a flash memory, Ethernet, a hard disk, or the like. The containment framework 306 is installed as software in the main memory 305.

Resources used in a JVM vary according to a method of implementing the JVM, Java middleware performed in the JVM, and types of Java applications. In general, when a Java application is performed in a JVM, representative examples of resources used are a file, a socket, a native memory, a heap memory, a CPU occupation rate, a CPU runtime, or the like.

FIG. 4 is a flowchart illustrating operations for generating and ending an application operated by an application manager 202 in a containment framework illustrated in FIG. 2.

First, the application manager 202 receives a request for generating a new application (operation 401), then generates an identifier for identifying an application (operation 402), and stores the identifier (operation 403). Next, the application is started (operation 404), a state is changed according to a lifecycle of the application, and then the application is ended (operation 405). In this related art process of generating and ending an application, it is possible to recognize that an operation for tracking resources used by an application and threads in the application is not considered at all.

FIG. 5 is a flowchart illustrating a process of allocating/releasing resources, wherein the process is performed when a Java application in a containment framework as illustrated in FIG. 2 is performed. Recently, a Multitasking Virtual Machine (MVM) technology ensuring complete independence of respective applications has been implemented. In the MVM, it is general to set a quota of resources related to the respective applications that are performed. A method of setting a quota may vary according to each of MVM solutions. However, in a general performing process, a request for allocating a specific resource is received (operation 501). Then, it is determined whether the sum of a quantity of usage for the resource currently being used by an application and a newly requested resource quantity, exceeds a maximum limit that is allowed for the application to use the resource (operation 502). If it is determined that the sum does not exceed the maximum limit, an update for increasing a quantity of usage for the resource as much as necessary according to the request is performed (operation 504), and thereby allocating the updated resource (operation 505). If it is determined that the sum exceeds the maximum limit that is allowed for the application to use the resource, the request for allocating the resource is rejected, i.e., an exception occurs (operation 503).

In this manner, in a conventional Java platform, a method of perceiving a current usage status of various kinds of resources such as a CPU runtime, a CPU occupation rate, a socket, a file, a native memory or the like used by an application and a thread (that is the smallest execution unit of a program) in the application executed in a JVM, and the method of setting a usage limitation for the resources is not provided. The only information on using resources, wherein the information is provided by a standard Java platform is a current quantity of usage and a maximum limit of a Java heap memory. In a conventional MVM environment, a method of managing resources used by an application is to set a quota related to each of the resources and to consider a current quantity of usage. However, there are limitations to this method since information in consideration of the quota and the quantity of usage for the resources is output in application units, it is impossible to know a quantity of usage consumed by each thread. Also, since there is no notification function for informing about variations in a quantity of resource usage by an application, it is impossible to know the degree of usage unless the quantity of resource usage is periodically checked. Finally, since a standard resource management method ensuring extension is not presented, each system selects a resource management method in an Ad-hoc mode, and is thereby incapable of ensuring compatibility for managing resources.

However, in recently developed electronic equipment e.g., Digital Television (DTV), set-top boxes, mobile phones, and the like, in which several Java applications are simultaneously performed, by using an application manager, managing resources used by each of the applications and threads in the applications is necessary so as to efficiently and fairly use limited resources.

SUMMARY OF THE INVENTION

The present invention provides a method and apparatus for managing resources used by applications and threads in the applications.

According to an aspect of the present invention, there is provided a method of managing resources related to a JVM and an application executed in the JVM, the method including the operations of defining a resource identifier enabling an arbitrary resource to be uniquely identified; generating a resource consumer for each of threads, wherein the resource consumer uses a resource; defining at least one or more resource managers for each of resource identifiers, wherein the resource manager manages a resource, and storing the at least one or more resource managers according to types in a resource manager registry; calculating a quantity of resource usage by resource managers generated for all applications and threads in the applications, and storing the calculated quantity of resource usage, wherein the calculating and storing of the quantity are performed by each of the at least one or more resource managers; and informing about the quantity of resource usage.

The at least one or more resource managers may register information on a threshold listener to which a notice informing about the quantity of resource usage is to be transferred, and store the information.

The calculating the quantity of resource usage may include calling all resource managers stored in the resource manager registry, wherein the resource managers are related to specific resources, and then adding a quantity of usage by the respective called resource managers.

According to another aspect of the present invention, there is provided a resource management system for managing resources related to a JVM and an application executed in the JVM, the resource management system including: a resource consumer management unit generating a resource consumer for each of threads, wherein the resource consumer uses a resource; and a resource allocation policy manager defining a resource identifier enabling an arbitrary resource to be uniquely identified, generating at least one or more resource managers for each of resource identifiers, wherein the at least one or more resource managers manages a resource, and setting a resource usage quota related to a resource identifier and a resource consumer, according to a request by the resource consumer management unit; wherein the resource manager has a function for calculating a quantity of resource usage by resource consumers generated for all applications and threads in the applications, storing the calculated quantity of resource usage, and informing about the quantity of resource usage.

The resource identifier and the resource manager may be generated by using Java language.

The resource allocation policy manager may be generated according to resource allocation policy information set within a program, or be generated by externally reading the information, and be modified in real-time via network communication while Java code is being executed.

The resource consumer management unit may generate a new resource consumer, and then inform the resource allocation policy manager about the new resource consumer, thereby registering the new resource consumer in a proper resource manager or setting a resource consumer quota related to a corresponding resource.

The resource management system may further include an application manager generating an application identifier related to a new application that is operated, and requesting the resource allocation policy manager for an operation, wherein the requested operation is necessary for applying a resource allocation policy that includes generation of a resource manager or setting of a quota related to the application.

According to another aspect of the present invention, there is provided a method of managing resources when an application is generated in a containment framework comprising a resource management system related to a JVM and an application executed in the JVM, the method including the operations of generating a unique identifier related to an application that is to be executed, and storing the unique identifier; setting a resource allocation policy calling a resource identifier that is in an initial array position of a list in which resource identifiers uniquely identifying resources are arrayed, when the resource identifier exists in the initial array position, generating a resource manager related to the resource identifier that is a resource, setting a maximum usage value that is a quota related to the generated resource manager, registering the resource manager in a resource manager registry in which registered resource managers are stored according to types, and storing information on the generated resource manager and application identifier; and starting an application, and changing a state of the application according to its lifecycle.

According to another aspect of the present invention, there is provided a method of managing resources of threads by treating all of the threads performed in a JVM as resource consumers, the method including the operations of generating modified JVM threads related to the threads, wherein the operation of generating the modified JVM threads includes the operations of calling a start( ) method of a certain thread object; requesting resource consumer object allocation for the certain thread object; generating a new resource consumer object according to the request, and obtaining an identifier of an application in which the certain thread object belongs; transferring information on the generated new resource consumer object and the application identifier, and requesting setting of a resource allocation policy related to for a corresponding resource consumer; and when the setting of the resource allocation policy for the corresponding resource consumer is ended, performing a run( ) function of the thread object, and generating a native thread.

The operation of setting the resource allocation policy includes the operations of requesting an initial resource identifier that is the first on an array in a resource identifiers list; when a position for the initial resource identifier is not empty, having an identifier of an application to which a resource consumer related to a resource belongs, and obtaining a resource manager allocated to the resource; registering a resource consumer in the obtained resource manager; and setting a maximum value that may be used by the resource consumer.

Each of the resource managers has an internal variable containing a quantity of resource usage by the respective resource managers and by added respective resource consumers, in order to check a usage status, when a resource is allocated or returned (destructed), each of the resource managers calculates a quantity of usage by bringing a resource manager from a resource manager registry, wherein a current resource consumer belongs in the resource manager, and each of the resource managers updates a usage quantity of a resource manager and a resource consumer according to a resource allocation request.

A method of handling the resource allocation request via the resource consumer includes the operations of checking whether the sum of a requested resource quantity and a quantity of resource usage by a current resource manager exceeds a maximum quantity of resource usage allocated to the resource manager, when the resource allocation request is received; returning notification of a resource allocation failure, when the sum exceeds the maximum quantity of resource usage, and checking whether the sum of the requested resource quantity and a resource quantity used by a current resource consumer exceeds a maximum resource usage value (quota) allocated to the resource consumer, when the sum does not exceed the maximum quantity of resource usage; returning notification of a resource allocation failure, when the sum of the requested resource quantity and the resource quantity used by the current resource consumer exceeds the maximum resource usage value (quota) allocated to the resource consumer, and storing a current quantity of resource usage used by a resource manager as a temporary variable (a previous usage quantity value), when the sum does not exceed the maximum resource usage value (quota) allocated to the resource consumer, and increasing a quantity of resource usage to be used by a resource manager as requested (a current usage quantity value); checking if there is an overflow threshold set for a resource manager between the current usage quantity value and the previous usage quantity value, and if so, notifying of a threshold overflow; storing a current quantity of resource usage used by a resource consumer as a temporary variable (a previous usage quantity value), and increasing a quantity of resource usage to be used by a resource consumer as requested (a current usage quantity value); checking if there is an overflow threshold set for a resource consumer between the current usage quantity value and the previous usage quantity value, and if so, notifying of a threshold overflow; and returning notification of resource allocation approval, thereby realizing an actual resource allocation.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 6:
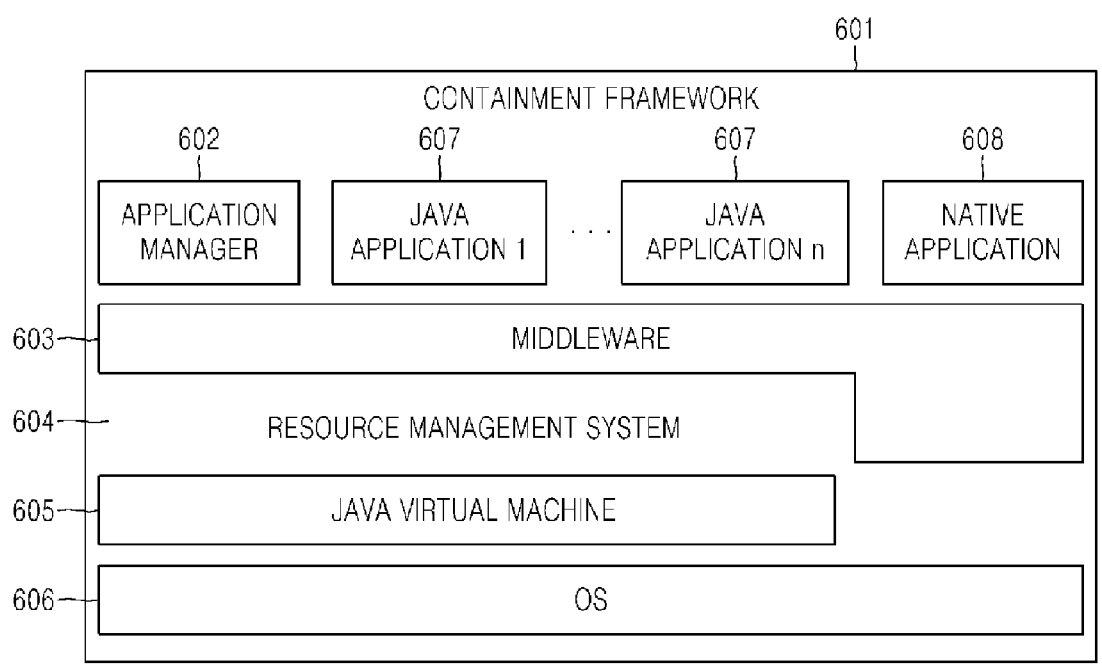
FIG. 6 is a block diagram illustrating a containment framework including a resource management system according to an exemplary embodiment of the present invention.

FIG. 6 is a block diagram illustrating a containment framework including a resource management system according to an exemplary embodiment of the present invention.

The containment framework illustrated in FIG. 6 includes an Operation System (OS) 606, a Java Virtual Machine (JVM) 605, middleware 603, e.g., the OCAP or the ACAP, which enables an application to be operated, an application manager 602 which manages a lifecycle of an application, Java applications 1 through n 607, a native application 608, and a resource management system 604 which manages resources used by an application and threads in the application according to an exemplary embodiment of the present invention.

Figure 1:
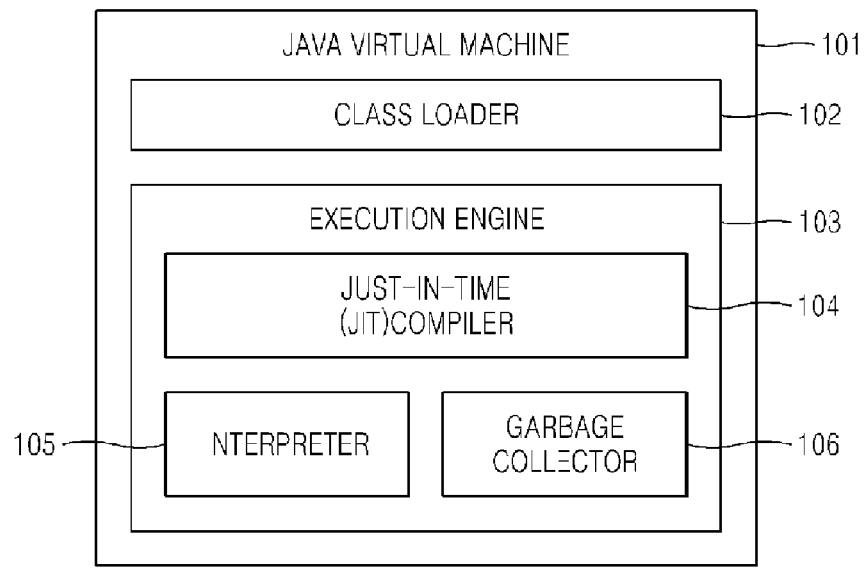
FIG. 1 is a block diagram illustrating a configuration of a related art JVM.
Figure 2:
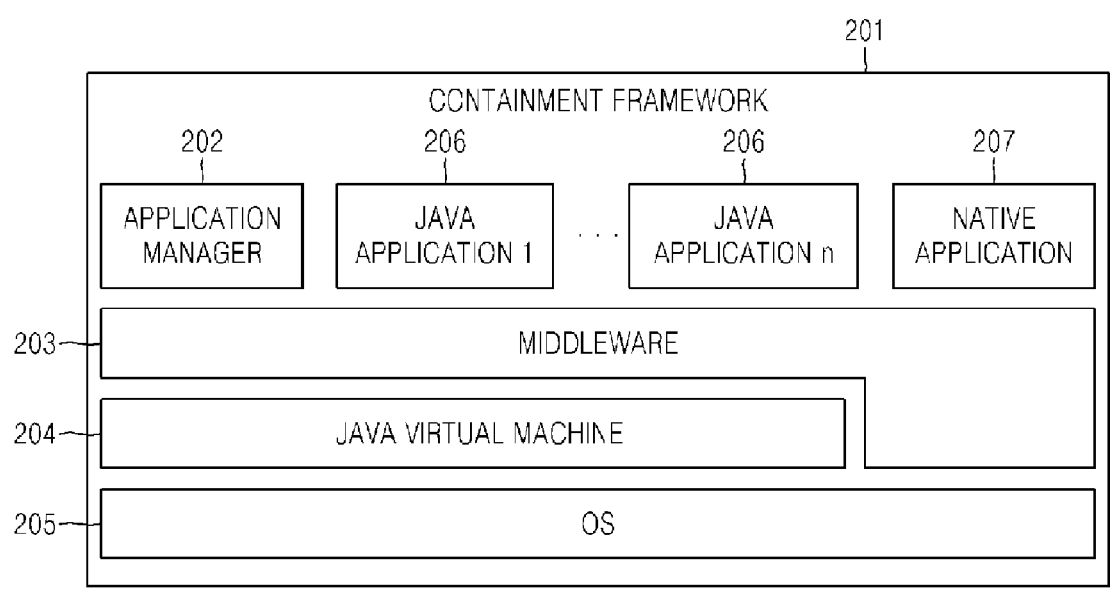
FIG. 2 is a block diagram illustrating a related art containment framework.
Figure 3:
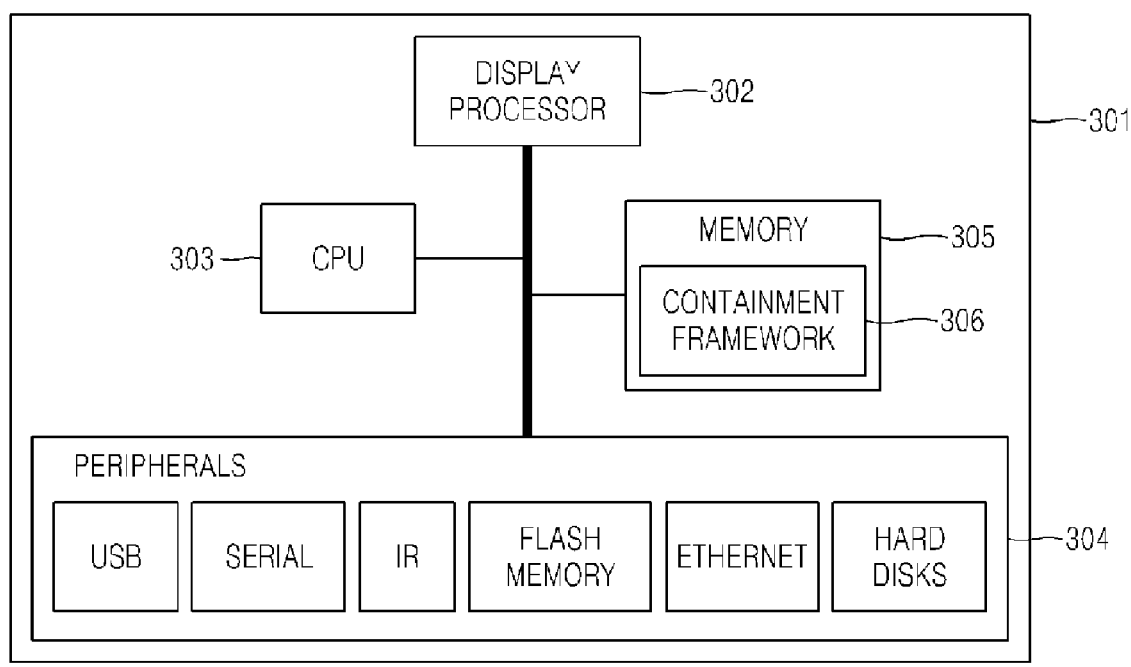
FIG. 3 is a diagram illustrating a structure of bidirectional digital data broadcasting information equipment in which a JVM is installed.
Figure 4:
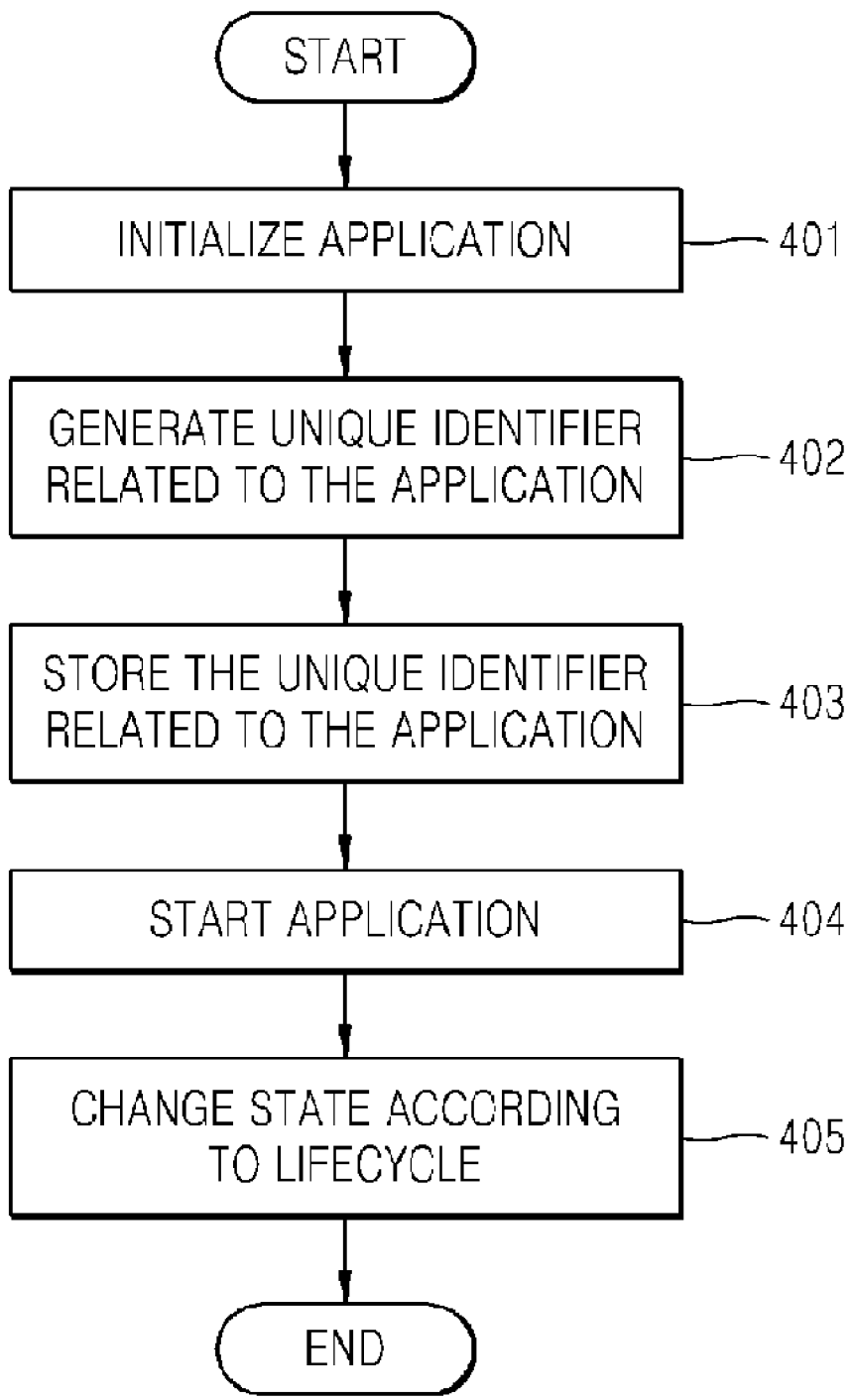
FIG. 4 is a flowchart illustrating a method of executing an application via a containment framework executing a related art application model.
Figure 5:
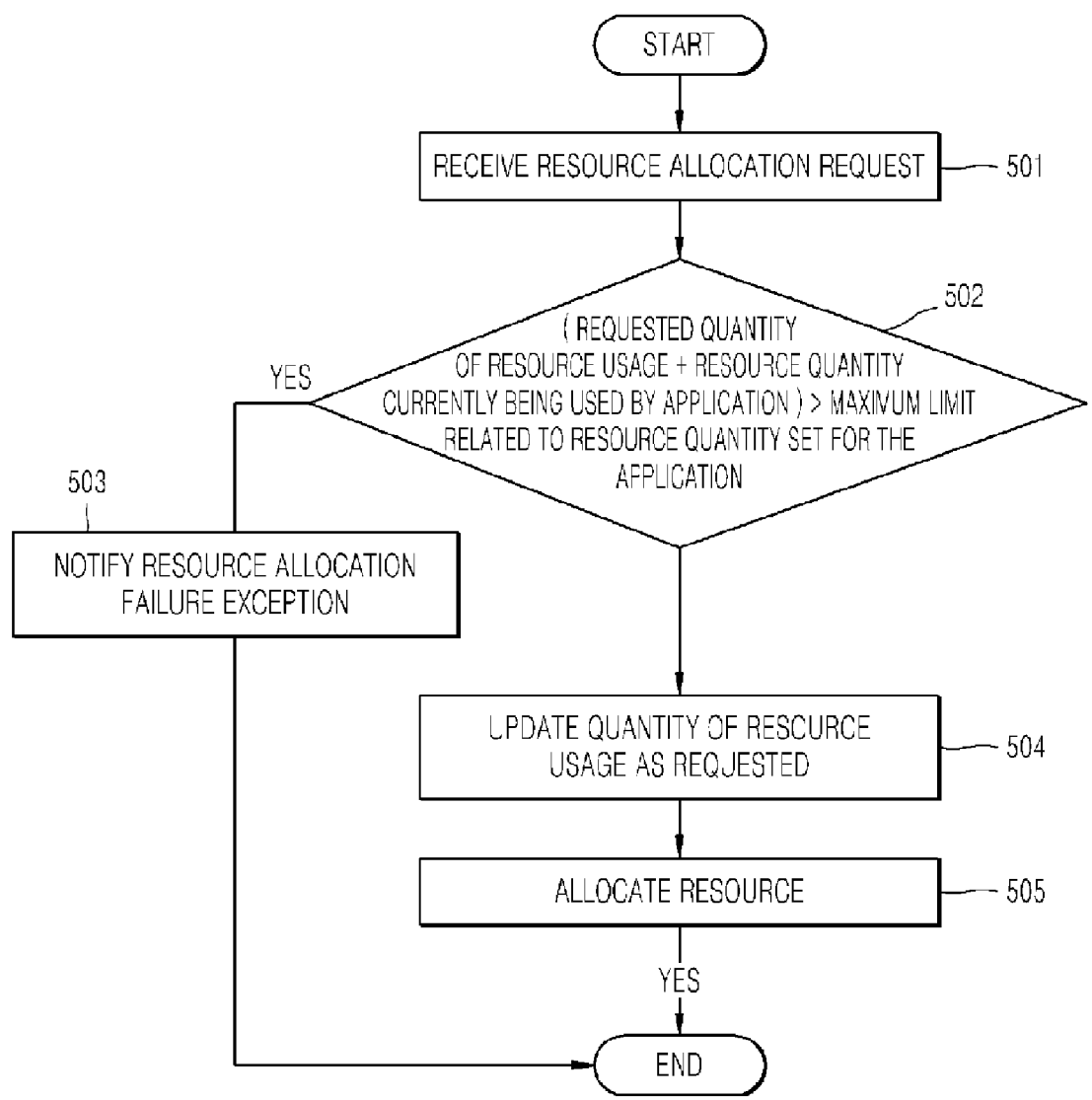
FIG. 5 is a flowchart illustrating a process of allocating a resource used while executing a Java application in a containment framework.

The containment framework including the resource management system 604 may be installed in a memory 305 illustrated in FIG. 3, thereby being applied to all application models in which an application manager manages a lifecycle of an application.

Figure 7:
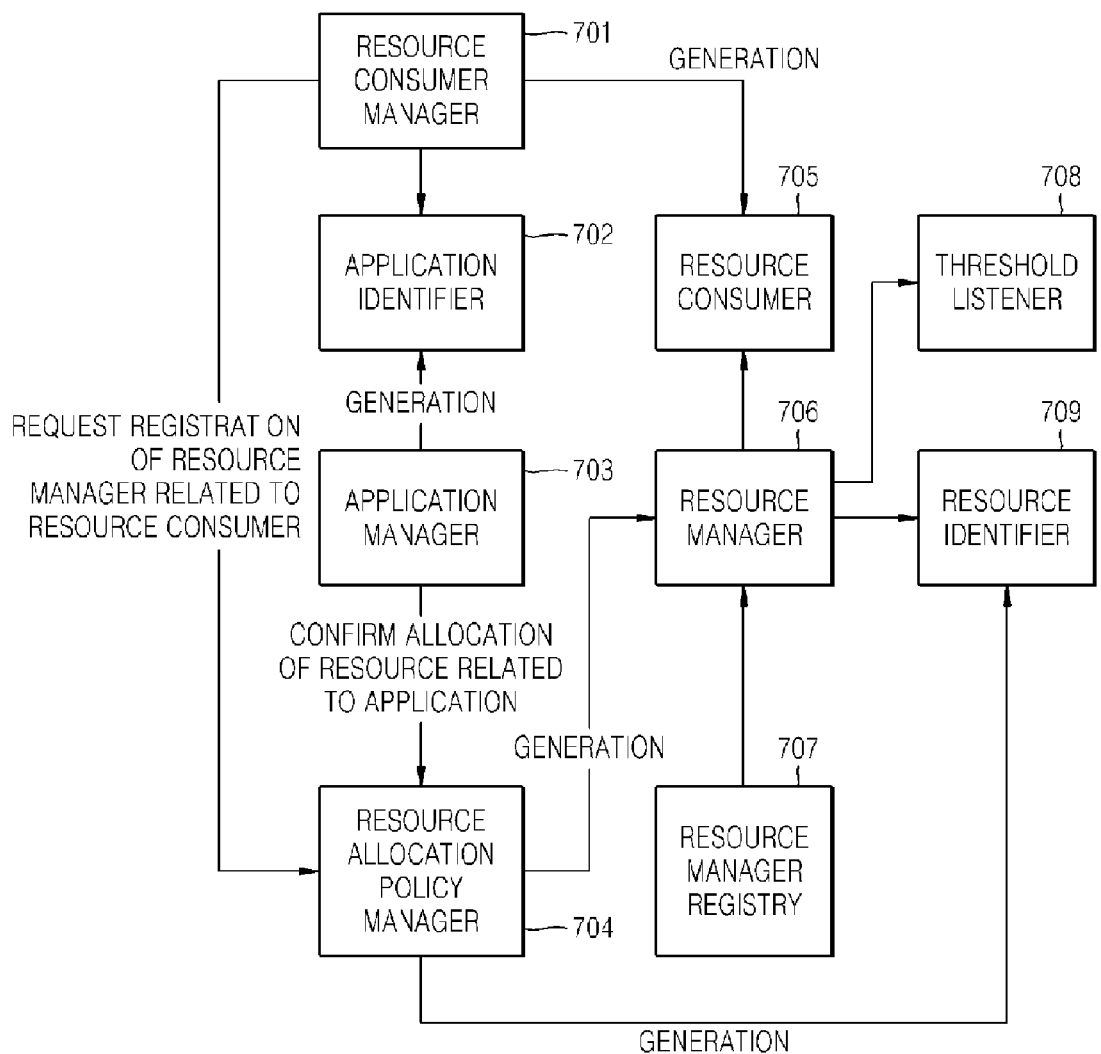
FIG. 7 is a block diagram illustrating a detailed configuration of a resource management system illustrated in FIG. 6.

FIG. 7 is a block diagram illustrating a detailed configuration of a resource management system 604 illustrated in FIG. 6.

First, it is assumed that a unique resource identifier 709 exists in each resource. The resource identifier 709 is provided in the form of an interface, thus, when a certain class implements a resource identifier interface, then an instance of the class is identified as a resource in a resource management system.

A resource manager 706 stores data of a current quantity of usage for a resource used by an application and threads in the application, and checks a set quota, so as to determine whether to re-allocate the resource. Also, the resource manager 706 may have a notification function for informing a quantity of resource usage thereby informing a threshold listener 708, checking a quantity of usage related to registered resources, about a variation in the quantity of resource usage. Likewise, in regard to the resource identifier 709, the resource manager 706 is provided in the form of an interface, and thus a class implementing the interface is treated as a resource manager. A plurality of the resource managers 706 may be generated for one resource. The resource manager 706 may also include a unique allocation policy.

A resource manager registry 707 registers all of the resource managers 706. At this time, the resource manager registry 707 classifies and stores the resource managers 706. Since all of the resource managers 706 are stored in the resource manager registry 707, a total quantity of usage of a specific resource used by all applications is calculated by calling all of the resource managers 706 related to the specific resource, from the resource manager registry 707, and adding a quantity of usage of the specific resource provided by the respective called resource managers 706.

A resource allocation policy manager 704 generates all resource identifiers 709 defined in a system, and has a resource identifier list. Also, the resource allocation policy manager 704 decides a quota that is to be allocated to a certain application or threads in the application. That is, the resource allocation policy manager 704 manages a policy for generating/allocating all resources and resource managers. A method of setting a resource allocation policy may vary according to an object in which the resource allocation policy is to be implemented. For example, information on a resource allocation policy may be stored in a program, the information may be read via an extensible markup language (XML) file, or a resource allocation policy may be changed in real-time during Java runtime via network communication.

A resource consumer 705 is a subject that consumes resources. In the present invention, the subject can be a thread generated in a JVM.

After a new resource consumer 705 is generated, a resource consumer manager 701 controls informing the resource allocation policy manager 704 of the resource consumer 705 so as to be registered in a proper resource manager 706, or controls setting a quota in the resource consumer 705 related to a corresponding resource. Also, when a resource consumer 705 is destructed, the resource consumer manager 701 de-registers the resource consumer 705 from all of the resource managers 706 in which the resource consumer 705 was registered.

When a new application has to be operated, an application manager 703 generates an application identifier 702 related to the application, and requests the resource allocation policy manager 704 for an operation, wherein the requested operation is necessary so as to apply a resource allocation policy, e.g., generation of a resource manager 706 or setting of a quota related to the application.

The detailed configuration and operation of the resource manager 706 will be described later with reference to FIG. 14.

Figure 8:
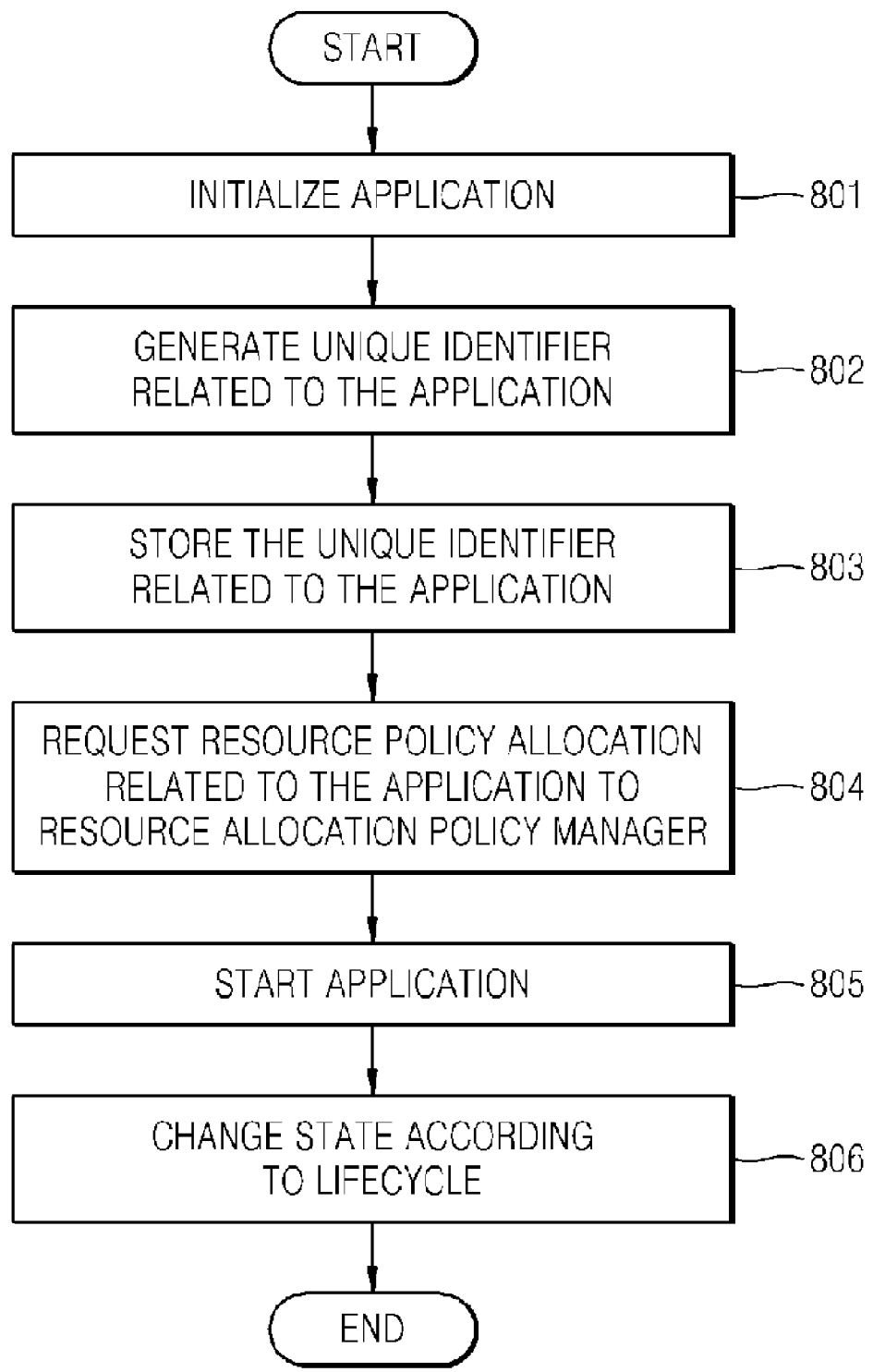
FIG. 8 is a flowchart illustrating a method of executing an application via a resource management system according to another exemplary embodiment of the present invention.

FIG. 8 is a flowchart illustrating a process of generating an application in a containment framework including a resource management system (or structure), according to an exemplary embodiment of the present invention.

First, an application is initialized (operation 801), a unique identifier related to the application is generated (operation 802), and stored (operation 803). Next, a resource allocation policy manager 704 is requested to apply a resource allocation policy related to the application (operation 804). Operation 804, which does not exist in a conventional process of executing an application, is a procedure of setting a resource allocation policy, before executing a new application. A detailed description thereof will be described later. After applying of a resource allocation policy related to the application is requested, an application is started (operation 805). A state of the application is changed according to its lifecycle, and then the application is finally ended (operation 806).

Figure 9:
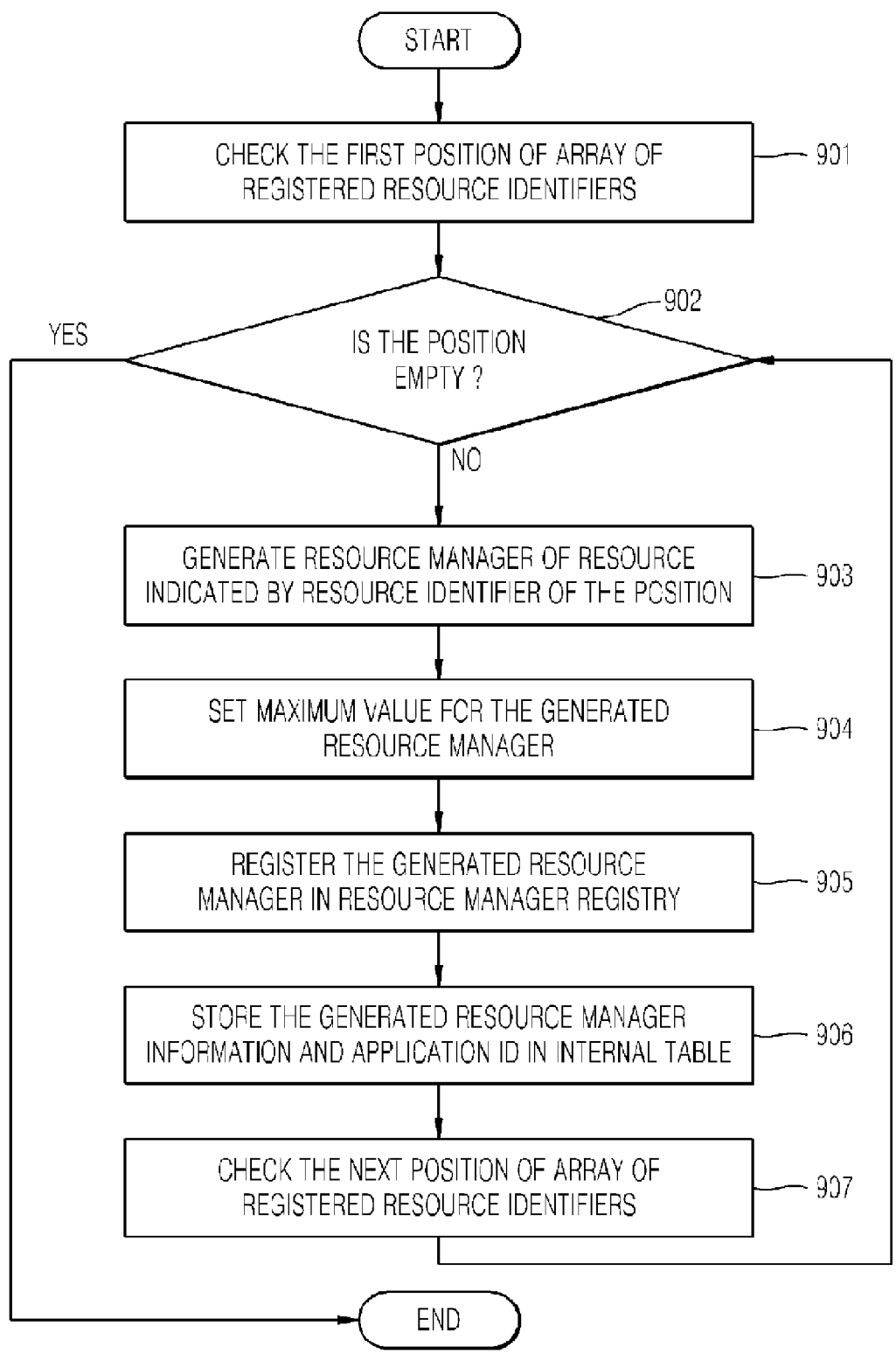
FIG. 9 is a flowchart illustrating a method of allocating a resource manager to an application with a resource policy manager according to another exemplary embodiment of the present invention.

FIG. 9 is a flowchart illustrating in detail an operation of setting a resource allocation policy related to an application, wherein the operation is illustrated in relation to FIG. 8 according to another exemplary embodiment of the present invention.

First, an initial resource identifier initially arrayed in a resource identifier list of a resource allocation policy manager 704 is requested (operation 901). When a resource identifier 709 exists in this initial array position ("NO" in operation 902), in other words, when a registered resource exists, then a resource manager 706 related to the resource is generated (operation 903). A maximum usage quota related to the generated resource manager 706 is set (operation 904). The resource manager 706 is registered in a resource manager registry (operation 905). Next, the generated resource manager 706 and information on an application identifier are stored in an internal table of the resource allocation policy manager 704 (operation 906). Then, the next array position of registered resources is checked (operation 907). The above described process is performed for all registered resources (operations 902 through 907).

The exemplary embodiment illustrated in FIG. 9 is true for a case where a quota is to be set for all registered resources related to all applications. That is, it is possible to generate a resource manager related to a specific resource following a policy of a resource allocation policy manager 704, and to set a quota. This process of generating the resource manager and setting the quota may vary according to a resource allocation policy.

Figure 10:
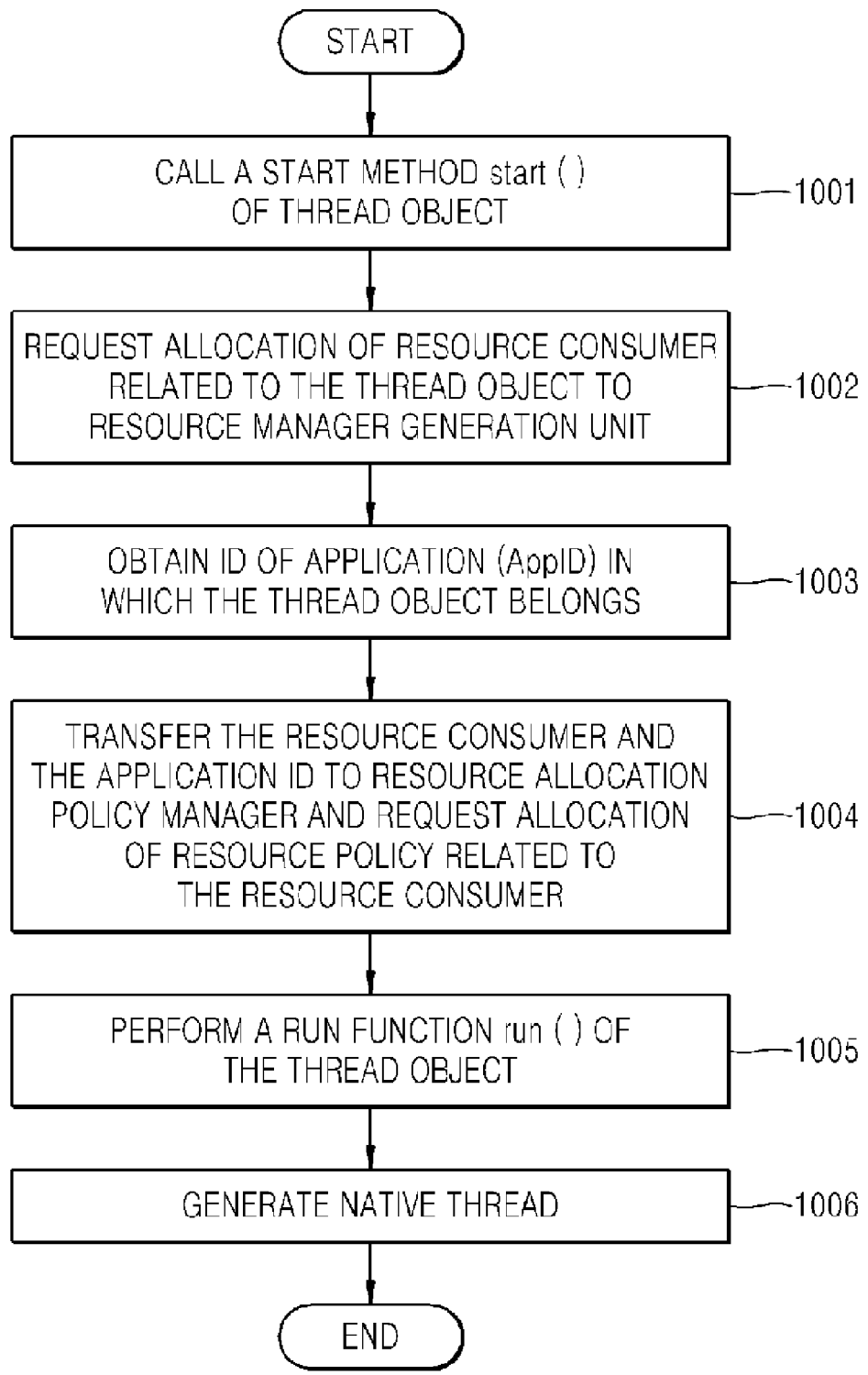
FIG. 10 is a flowchart illustrating a method of allocating a resource consumer for each thread generated in a JVM according to another exemplary embodiment of the present invention.

FIG. 10 is a flowchart illustrating a process performed by a JVM generation module modified so as to treat all threads as an individual resource consumer, wherein the threads are performed in a JVM.

First, a start( ) method of a certain thread object is called (operation 1001). A resource consumer manager 701 is requested for an allocation of a resource consumer object for the thread object (operation 1002). The resource consumer manager 701 generates a new resource consumer object, and then obtains an identifier related to an application (AppID) in which the thread object belongs (operation 1003). The generated resource consumer object and information on the application identifier are transferred to a resource allocation policy manager 704 so that setting of a resource allocation policy for the resource consumer is requested (operation 1004). After the resource allocation policy for the resource consumer has been set, a run( ) function of the thread object is performed (operation 1005). Operation 1005, a native thread is generated (operation 1006).

Figure 11:
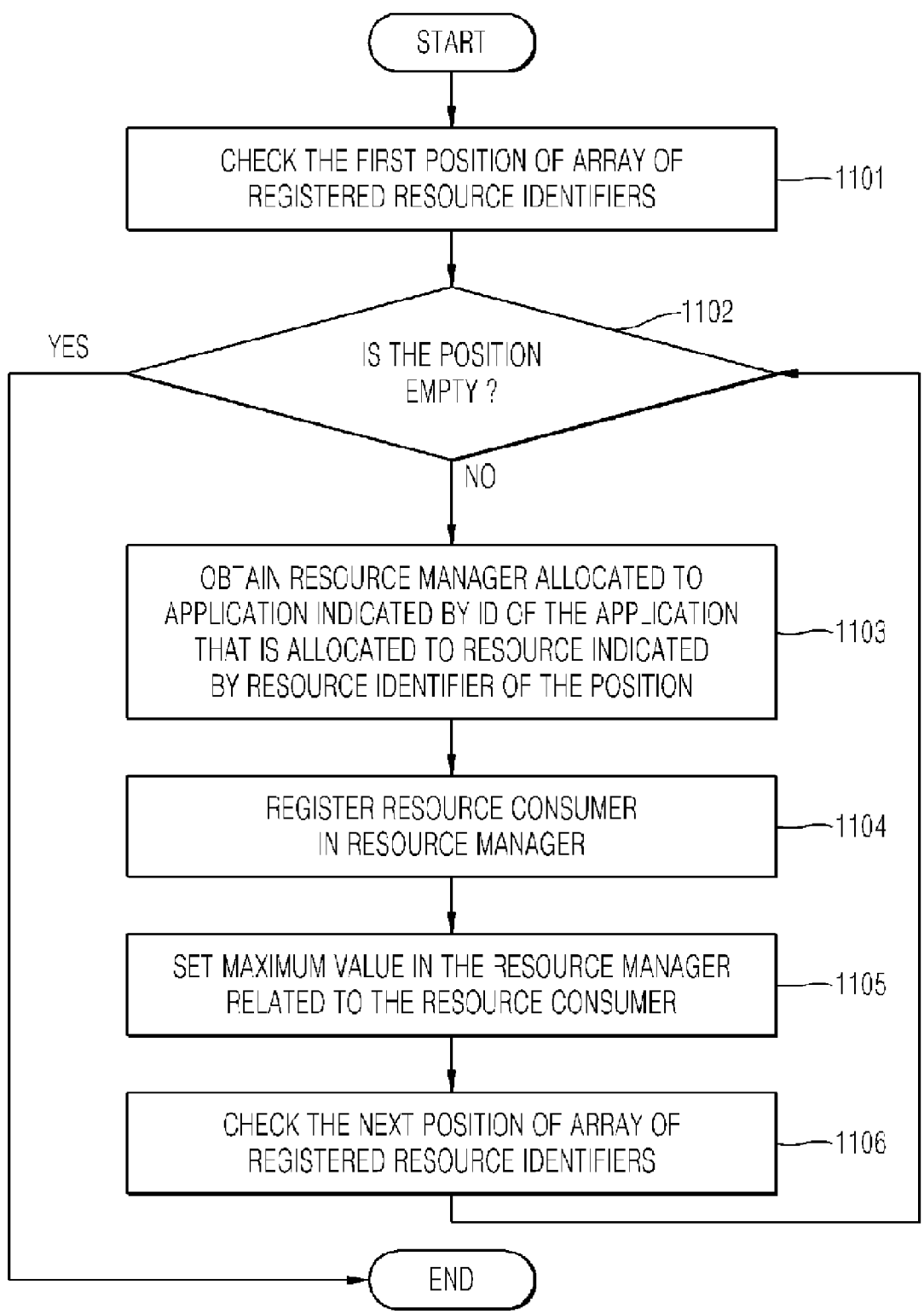
FIG. 11 is a flowchart illustrating a method of registering a generated resource consumer in a resource manager according to another exemplary embodiment of the present invention.

FIG. 11 is a flowchart illustrating a process of setting a resource allocation policy for a resource consumer according to resource consumer information transferred to a resource allocation policy manager 704 in operation 1004 illustrated in FIG. 10 according to another exemplary embodiment of the present invention.

An initial resource identifier on an array in a resource identifier list included in the resource allocation policy manager 704 is requested (operation 1101). When a position for the initial resource identifier is not empty ("NO" in operation 1102), in other words, when there is a registered resource, a resource manager can be called by an application identifier to which a resource consumer for the resource is related (operation 1103). Next, the resource allocation policy manager 704 registers the resource consumer in the resource manager (operation 1104). Then, a maximum quota possibly used by the resource consumer is set (operation 1105). The next array position of registered resources is then checked (operation 907). (operation 1106). The aforementioned operations 1102 through 1106 are performed for all registered resources.

In the exemplary embodiment illustrated in FIG. 11, all resource consumers related to all registered resources are added in a resource manager, and a maximum quota related to all of the registered resources, and the maximum quota for each resource used by the respective resource consumers, is set. That is, according to a policy of a resource allocation policy manager 704, it is possible to add a specific resource and a specific resource consumer in a resource manager, and to set a quota. According to the resource allocation policy, contents and a set quota value that are to be added in the resource manager may differ.

Each resource manager has an internal variable storing a quantity of resource usage by the respective resource managers and by added resource consumers. In order to check this usage status, in a part in which allocation and return (destruction) of resources are performed, a resource manager, to which a current resource consumer belongs, is brought from a resource manager registry. Then, the quantity of resource usage by the resource manager and the current resource consumer, which are checked, is updated.

Figure 12:
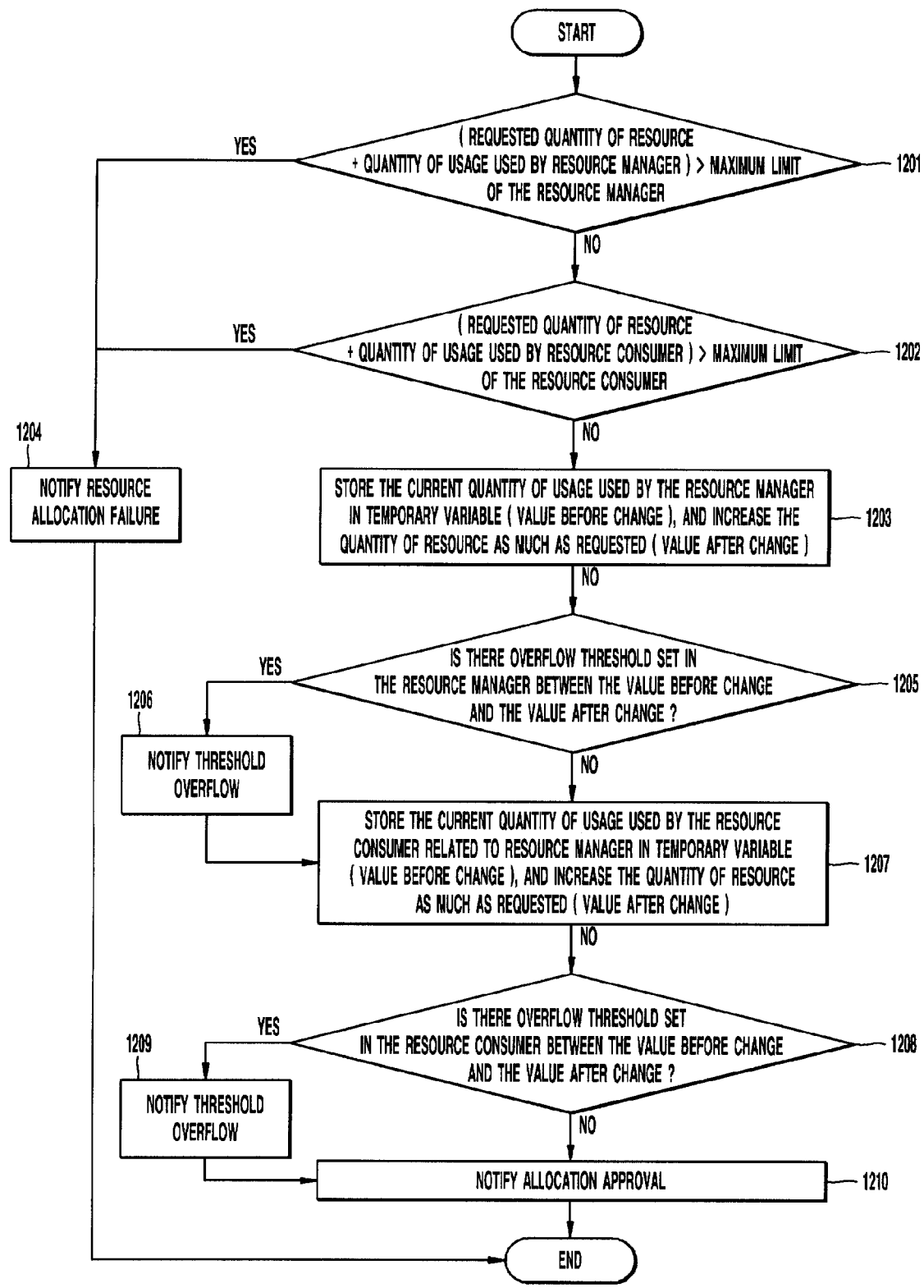
FIG. 12 is a flowchart illustrating a method of processing a resource allocation request by a resource manager according to another exemplary embodiment of the present invention.

FIG. 12 is a flowchart illustrating a method of processing a resource allocation request by a resource manager 706 according to another exemplary embodiment of the present invention.

First, when the resource allocation request is received, it is checked whether the sum of a requested resource quantity and a quantity of resource usage by a current resource manager exceeds a maximum quantity of resource usage that is allocated to the resource manager (operation 1201). When the sum exceeds the maximum quantity of resource usage, notification of a resource allocation failure is returned (operation 1204). When the sum does not exceed the maximum quantity of resource usage, it is checked whether the sum of the requested resource quantity and a resource quantity used by a current resource consumer exceeds a maximum resource usage value (quota) that is allocated to the resource consumer (operation 1202). When the sum of the requested resource quantity and the resource quantity used by the current resource consumer exceeds the maximum resource usage value (quota) that is allocated to the resource consumer, notification of a resource allocation failure is returned (operation 1204). When the sum does not exceed the maximum resource usage value (quota) that is allocated to the resource consumer in operation 1202, a current quantity of resource usage by a resource manager is stored as a temporary variable (a previous usage quantity value), and a quantity of resource usage to be used by a resource manager is increased as requested (a current usage quantity value) in operation 1203. It is checked if there is an overflow threshold set for a resource manager between the current usage quantity value and the previous usage quantity value (operation 1205). If so, a threshold overflow is notified (operation 1206). Next, a current quantity of resource usage by a resource consumer is stored in a temporary variable (a previous usage quantity value), and a quantity of resource usage to be used by a resource consumer is increased as requested (a current usage quantity value) in operation 1207. Afterwards, it is checked if there is an overflow threshold set for a resource consumer between the current usage quantity value and the previous usage quantity value (operation 1208). If so, a threshold over is notified (operation 1209). Finally, notification of resource allocation approval is returned (operation 1210). After the resource allocation approval, an actual resource allocation is performed.

Figure 13:
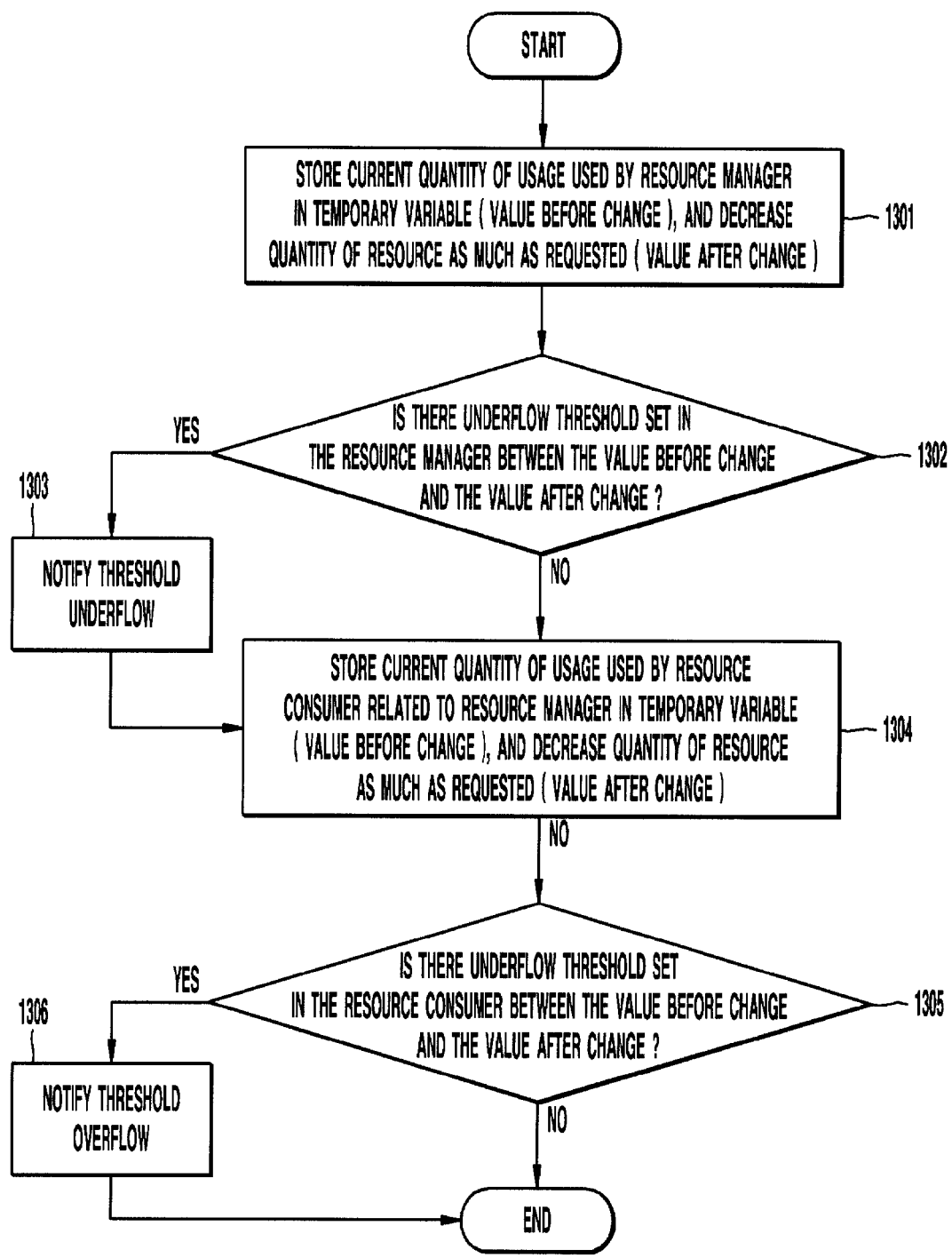
FIG. 13 is a flowchart illustrating a method of processing a resource destruction by a resource manager according to another exemplary embodiment of the present invention.

FIG. 13 is a flowchart illustrating a method of processing a resource destruction request by using a resource manager 706 according to another exemplary embodiment of the present invention.

When a request for destructing (releasing) a resource is received, a current quantity of resource usage by a resource manager is stored as a temporary variable (a previous usage quantity value), and it is decreased as requested according to a quantity of resource usage of a resource manager (a current usage quantity value) in operation 1301. Then, it is checked if there is an underflow threshold set to a resource manager between the current usage quantity value and the previous usage quantity value (operation 1302). If so, a threshold underflow is notified (operation 1303). Afterward, a current quantity of resource usage used by a resource consumer is stored as a temporary variable (a previous usage quantity value), and it is decreased as requested according to a quantity of resource usage of a resource consumer (a current usage quantity value) in operation 1304. Then, it is checked if there is an underflow threshold set to a resource consumer between the current usage quantity value and the previous usage quantity value (operation 1305). If so, a threshold underflow is notified (operation 1306). After this process, a resource is actually released.

Figure 14:
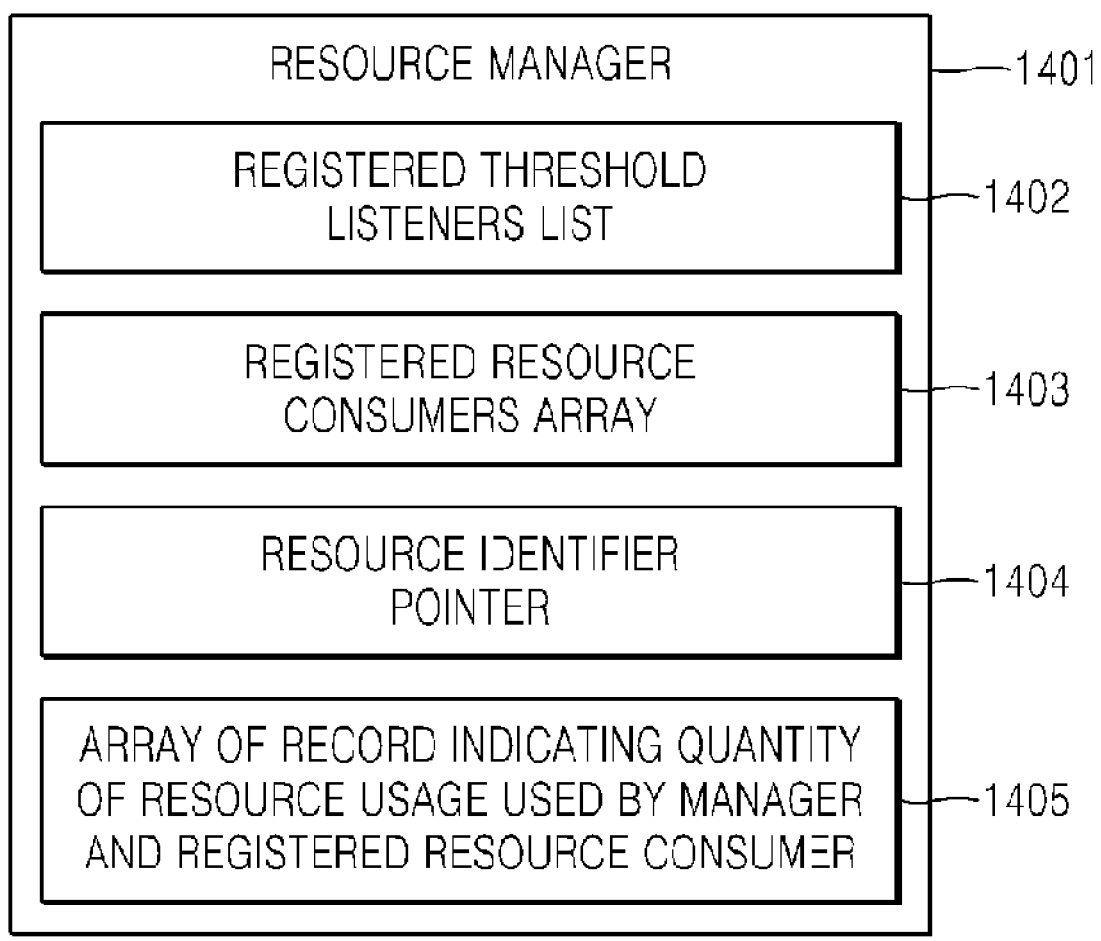
FIG. 14 is a block diagram illustrating a detailed configuration of a resource manager illustrated in FIG. 7.

FIG. 14 is a block diagram illustrating a detailed configuration of a resource manager 706 illustrated in FIG. 7.

Since the resource manager 706 is generated for one resource indicated by a resource identifier, the resource manager 706 includes a resource identifier pointer 1404 for identifying which resource corresponds to a resource manager.

When an arbitrary resource consumer wants to share a quota of a resource manager, the arbitrary resource consumer is registered in the resource manager. Registered resource consumers are arrayed on a list (1403). Since the resource manager 706 has to have information on a quantity of resource usage used by the resource manager 706 and the respective registered resource consumers, the resource manager 706 includes a record array 1405 of current usage quantity information. The resource manager 706 also includes a list 1402 in which threshold listeners 708 are arrayed. The threshold listener 708 may be registered in the resource manager 706 and the respective registered resource consumers. When a quantity of usage reaches a specific value, notification is delivered to the registered and related threshold listeners 708.

According to the exemplary embodiments of the present invention, in a Java performance environment in which a containment framework is executed, calculation of a quantity of resource usage used by an application and threads in the application, and a notification function for notifying about the quantity of resource usage may be possible via a resource management structure including a resource manager. Therefore, more accurate allocation of resources may be performed. Also, when a resource allocation policy manager according to the present invention is implemented so as to enable modification via a network, a resource usage policy may be modified while a JVM performs. As a result, checking of a limitation of using resources per threads may be performed via a resource management managed for each of the threads, wherein the resource management is more accurate than a conventional resource management managed for each application. Also, by including a registry such as a resource manager registry, access to a resource manager is unified, so that accessibility to the resource manager is enforced. Finally, since a resource identifier, a resource manger, and the like are provided in the form of a Java interface, a resource and a resource manager are easily implemented.

A resource manager and a resource management system (framework) according to the present invention are made by using Java language, and are thereby capable of being easily applied to various platforms and of ensuring extension for managing resources provided by a third party.

By using a method and apparatus for managing resources used by an application and threads in the application according to the present invention, it is possible to perceive a usage quantity of resources used by a JVM and to control the usage quantity, for the application and the threads in the application. Accordingly, fair usage of the resources can be possible.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of managing resources related to a Java Virtual Machine (JVM) and an application executed in the JVM, the method comprising:
    defining a resource identifier which uniquely identifies an arbitrary resource;
    generating a resource consumer for each of a plurality of threads, wherein the resource consumer uses a resource;
    generating at least one resource manager for each resource identifier, wherein the at least one resource manager manages a resource;
    storing the at least one resource manager in a resource manager registry;
    calculating a quantity of resource usage by resource managers generated for all applications and threads in the applications, and storing the calculated quantity of resource usage, wherein the calculating and storing of the quantity of resource usage are performed by each of the resource managers; and
    informing about the quantity of resource usage.

2. The method of claim 1, wherein the at least one resource managers registers information on a threshold listener to which a notice informing about the quantity of resource usage is to be transferred, and stores the information.

3. The method of claim 1, wherein the calculating of the quantity of resource usage comprises calling all resource managers stored in the resource manager registry, wherein the resource managers are related to specific resources, and then adding a quantity of usage by the respective called resource managers.

4. A resource management system for managing resources related to a Java Virtual Machine (JVM) and an application executed in the JVM, the resource management system comprising:
    a resource consumer management unit which generates a resource consumer for each of threads, wherein the resource consumer uses a resource; and
    a resource allocation policy manager which defines a resource identifier enabling an arbitrary resource to be uniquely identified, generates one or more resource manager for each resource identifier, wherein the at least one resource manager manages a resource, and sets a resource usage quota related to a resource identifier and a resource consumer, according to a request by the resource consumer management unit;
    wherein the resource manager calculates a quantity of resource usage by resource consumers generated for all applications and threads in the applications, stores the calculated quantity of resource usage, and informs about the quantity of resource usage.

5. The resource management system of claim 4, wherein the resource identifier and the resource manager are generated by using Java language.

6. The resource management system of claim 4, wherein the resource allocation policy manager is generated according to resource allocation policy information set within a program, or is generated by externally reading the information, and is modified in real-time via network communication while Java code is being executed.

7. The resource management system of claim 4, wherein the resource consumer management unit generates a new resource consumer, and then informs the resource allocation policy manager about the new resource consumer, thereby registering the new resource consumer in a proper resource manager or setting a resource consumer quota related to a corresponding resource.

8. The resource management system of claim 4, further comprising an application manager which generates an application identifier related to a new application that is operated, and requests the resource allocation policy manager for an operation, wherein the requested operation is necessary for applying a resource allocation policy that comprises generation of a resource manager or setting of a quota related to the application.

9. A method of managing resources when an application is generated in a containment framework comprising a resource management system related to a Java Virtual Machine (JVM) and an application executed in the JVM, the method comprising:
    generating a unique identifier related to an application that is to be executed;
    storing the unique identifier;
    setting a resource allocation policy calling a resource identifier that is in an initial array position of a list in which resource identifiers uniquely identifying resources are arrayed;
    if the resource identifier exists in the initial array position, generating a resource manager related to the resource identifier that is a resource, setting a maximum usage value that is a quota related to the generated resource manager, registering the resource manager in a resource manager registry in which registered resource managers are stored according to types, and storing information on the generated resource manager and application identifier; and
    starting an application, and changing a state of the application according to a lifecycle of the application.

10. A method of managing resources of threads by treating all of the threads performed in a Java Virtual Machine (JVM) as resource consumers, the method comprising:
    generating modified JVM threads related to the threads;
    wherein the generating the modified JVM threads comprises:
    calling a start( )method of a certain thread object;
    requesting resource consumer object allocation for the certain thread object;
    generating a new resource consumer object according to the request, and obtaining an identifier of an application in which the certain thread object belongs;
    transferring to a resource allocation policy manager information on the generated new resource consumer object and the application identifier, and requesting setting of a resource allocation policy for a corresponding resource consumer; and
    if the setting of the resource allocation policy for the corresponding resource consumer is ended, performing a run( )function of the thread object and generating a native thread.

11. The method of claim 10, wherein the setting the resource allocation policy comprises:
    requesting an initial resource identifier that is first on an array in a resource identifiers list;
    if a position for the initial resource identifier is not empty, having an identifier of an application to which a resource consumer related to a resource belongs, and obtaining a resource manager allocated to the resource;

registering a resource consumer in the obtained resource manager; and setting a maximum value that may be used by the resource consumer.

12. The method of claim 11, wherein each resource manager has an internal variable containing a quantity of resource usage by respective resource managers and by added respective resource consumer, in order to check a usage status, if a resource is allocated or returned, each resource manager calculates a quantity of usage by bringing a resource manager from a resource manager registry, wherein a current resource consumer belongs in the resource manager, and each resource manager updates a usage quantity of a resource manager and a resource consumer according to a resource allocation request.

13. The method of claim 12, further comprising:

in response to receipt of the resource allocation request, determining whether a sum of a requested resource quantity and a quantity of resource usage by a current resource manager exceeds a maximum quantity of resource usage allocated to the current resource manager;

if it is determined that the sum of the requested resource quantity and the quantity of resource usage by the current resource manager exceeds the maximum quantity of resource usage allocated to the current resource manager, returning notification of a resource allocation failure;

if it is determined that the sum of the requested resource quantity and the quantity of resource usage by the current resource manager does not exceed the maximum quantity of resource usage allocated to the current resource manager, determining whether a sum of the requested resource quantity and a resource quantity used by a current resource consumer exceeds a maximum resource usage value allocated to the current resource consumer;

if it is determined that the sum of the requested resource quantity and the resource quantity used by the current resource consumer exceeds the maximum resource usage value allocated to the current resource consumer, returning notification of a resource allocation failure;

if it is determined that the sum of the requested resource quantity and the resource quantity used by the current resource consumer does not exceed the maximum resource usage value allocated to the current resource consumer, storing a current quantity of resource usage used by the current resource manager as a first previous usage quantity value, and increasing a first current usage quantity value corresponding to a quantity of resource usage to be used by the current resource manager as requested;

determining whether there is a first overflow threshold set for the current resource manager between the first current usage quantity value and the first previous usage quantity value, and if it is determined that the first overflow threshold is set, notifying of a threshold overflow;

storing a current quantity of resource usage used by the current resource consumer as a second previous usage quantity value, and increasing a second current usage quantity value corresponding to a quantity of resource usage to be used by the current resource consumer as requested;

determining whether there is an second overflow threshold set for the current resource consumer between the second current usage quantity value and the second previous usage quantity value, and if it is determined that the second overflow threshold is set, notifying of a threshold overflow; and returning notification of resource allocation approval, thereby realizing an actual resource allocation.

\* \* \* \* \*